(12) United States Patent
Declerck et al.

(10) Patent No.: US 7,047,017 B2
(45) Date of Patent: May 16, 2006

(54) METHOD FOR INITIATING A COMMUNICATION WITHIN A COMMUNICATION SYSTEM

(75) Inventors: Daniel J. Declerck, Lake Barrington, IL (US); John C. Kay, Elgin, IL (US)

(73) Assignee: Motorola, Inc., Schaumburg, IL (US)

( * ) Notice: Subject to any disclaimer, the term of this patent is extended or adjusted under 35 U.S.C. 154(b) by 457 days.

(21) Appl. No.: 10/141,149

(22) Filed: May 8, 2002

(65) Prior Publication Data
US 2002/0128013 A1 Sep. 12, 2002

Related U.S. Application Data

(63) Continuation-in-part of application No. 09/677,278, filed on Oct. 2, 2000.

(51) Int. Cl.
*H04B 7/00* (2006.01)

(52) U.S. Cl. ............... 455/452.1; 455/450; 455/525; 455/67.13; 455/517

(58) Field of Classification Search ........ 455/524–525, 455/517, 509, 434, 436–437, 450, 513, 515, 455/520, 422.1, 67.13; 370/320, 331, 332, 370/342
See application file for complete search history.

(56) References Cited

U.S. PATENT DOCUMENTS

| 6,137,993 | A * | 10/2000 | Almgren et al. ......... 455/67.13 |
| 6,141,559 | A * | 10/2000 | Neumiller et al. .......... 455/525 |
| 6,169,731 | B1 * | 1/2001 | Stewart et al. ............... 370/332 |
| 6,374,098 | B1 * | 4/2002 | Raith et al. ............... 455/404.2 |
| 6,597,913 | B1 * | 7/2003 | Natarajan ................... 455/453 |
| 6,618,589 | B1 * | 9/2003 | Rune et al. .............. 455/435.1 |
| 6,674,736 | B1 * | 1/2004 | Tiedemann, Jr. ............ 370/332 |
| 2003/0073455 | A1 * | 4/2003 | Hashem et al. ............. 455/525 |
| 2004/0246917 | A1 * | 12/2004 | Cheng et al. ............... 370/328 |
| 2005/0009527 | A1 * | 1/2005 | Sharma ..................... 455/445 |
| 2005/0113100 | A1 * | 5/2005 | Oprescu-Surcobe et al. ..... 455/450 |

FOREIGN PATENT DOCUMENTS

| EP | 0 926 915 A2 | 6/1999 |
| WO | WO 96 33587 A1 | 10/1996 |

OTHER PUBLICATIONS

"Upper Layer (Layer 3) Signaling Standard for cdma2000 Standards for Spread Spectrum Systems" TIA/EIA Interim Standard. TIA/EIA/IS-2000.5-A. Retreived from the Internet <URL:www.tiaonline.org/standards/sfg/imt2k/cdma2000>.

* cited by examiner

*Primary Examiner*—Joseph Feild
*Assistant Examiner*—Kamran Afshar
(74) *Attorney, Agent, or Firm*—Lalita W. Pace

(57) ABSTRACT

After a base station (101) receives a communication initiation request from a remote unit (113), the base station determines (101) those base stations (101–103) that are capable of supporting communication with the remote unit (113). The eligible base stations (Active Set) are instructed to "listen" for communication from the remote unit (113), and the remote unit (113) is provided the Active Set. Once the remote unit (113) receives the Active Set of base stations, the remote unit then determines the base station (103) having the best radio environment characteristics, and begins communication with that base station (103).

4 Claims, 3 Drawing Sheets

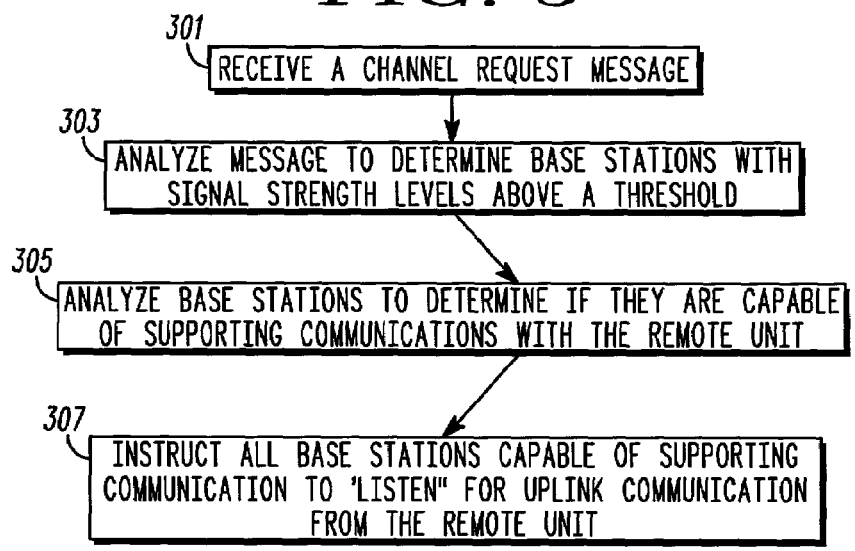
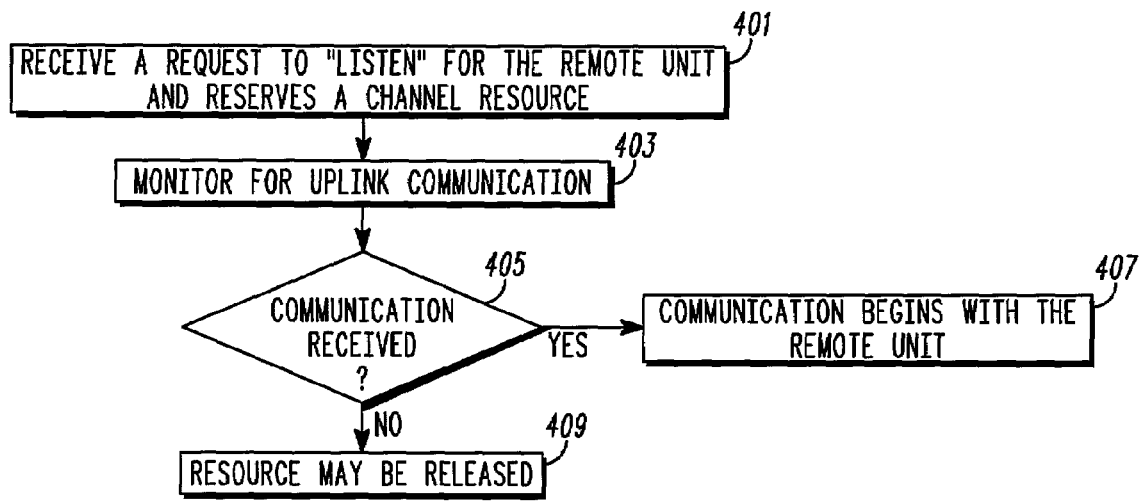

METHOD FOR INITIATING A COMMUNICATION WITHIN A COMMUNICATION SYSTEM

CROSS-REFERENCE TO RELATED APPLICATION

This application is a continuation-in-part of U.S. patent application Ser. No. 09/677,278, filed Oct. 2, 2000.

FIELD OF THE INVENTION

This invention relates in general to wireless communication systems, and more specifically to a method and apparatus for initiating a communication within such communication systems.

BACKGROUND OF THE INVENTION

Current CDMA systems implement call origination via a channel assignment message sent from a base station. More particularly, a mobile or remote unit will monitor its radio environment to determine those base stations having the best radio environment characteristics (OTHER_REPORTED_LIST). The remote unit then sends an origination message to a candidate base station having the best radio environment characteristics. The origination message contains the OTHER_REPORTED_LIST of base stations. The base station that received the origination message then sends a channel assignment message to the remote unit instructing the remote unit to begin communication with a particular base station.

Unfortunately, there exists situations where the remote unit's radio environment changes so rapidly that by the time a channel assignment message reaches the remote unit, another base station will better serve the mobile. During these situations, the remote unit will begin communication with an inferior base station. Therefore, a need exists for a method and apparatus for performing call origination within a communication system that reduces the chances that a remote unit will originate a call with a base station having inferior radio environment characteristics.

BRIEF DESCRIPTION OF THE DRAWINGS

FIG. 3 is a flow chart showing operation of a base station in FIG. 1 in accordance a first embodiment of the present invention.

FIG. 4 is a flow chart showing operation of a base station in FIG. 1 in accordance a second embodiment of the present invention.

DETAILED DESCRIPTION OF THE DRAWINGS

In order to solve the above-mentioned need, a method and apparatus for performing call origination within a communication system is provided herein. In accordance with the preferred embodiment of the present invention, after a base station receives a call origination message from a remote unit, the base station determines those base stations (within the OTHER_REPORTED_LIST of base stations) that are capable of supporting communication with the remote unit. The eligible base stations (Active Set) are instructed to "listen" for communication from the remote unit, and the remote unit is provided the Active Set. Once the remote unit receives the Active Set of base stations, the remote unit then determines the base station having the best radio environment characteristics, and begins communication with that base station.

Because the remote unit determines which base station to begin communication with, the radio environment characteristics of each base station within the Active Set are taken into consideration at the time of call origination. Since radio environment characteristics are taken into consideration at the time of call origination, the chances that a remote unit will originate a call with a base station having inferior radio environment characteristics is greatly reduced.

The present invention encompasses a method for performing call origination within a communication system. The method comprises the steps of sending, by a remote unit, a channel request message to a base station, and in response to the channel request message, receiving by the remote unit, a list of base stations capable of communicating with the remote unit. The remote unit determines a best-serving base station from the list of base stations capable of communicating with the remote unit and initiates communication with the best-serving base station.

The present invention additionally encompasses a method comprising the steps of receiving a channel request message from a remote unit and analyzing the channel request message to obtain a list of base stations received by the remote unit having a signal strength above a threshold. A plurality of base stations from the list of base stations is instructed to listen for uplink communication from the remote unit, wherein the instruction causes the plurality of base stations to reserve a traffic/data channel for communication with the remote unit.

The present invention additionally encompasses a method for performing call origination within a communication system. The method comprises the steps of receiving an instruction to listen for uplink communication from a remote unit and in response to the instruction to listen, reserving an uplink communication channel for communicating with the remote unit. Finally, a base station selection indication (WALSH_COVER) is received from the remote unit, wherein the WALSH_COVER comprises a reserved field within an uplink channel transmitted from the remote unit.

Figure 1:
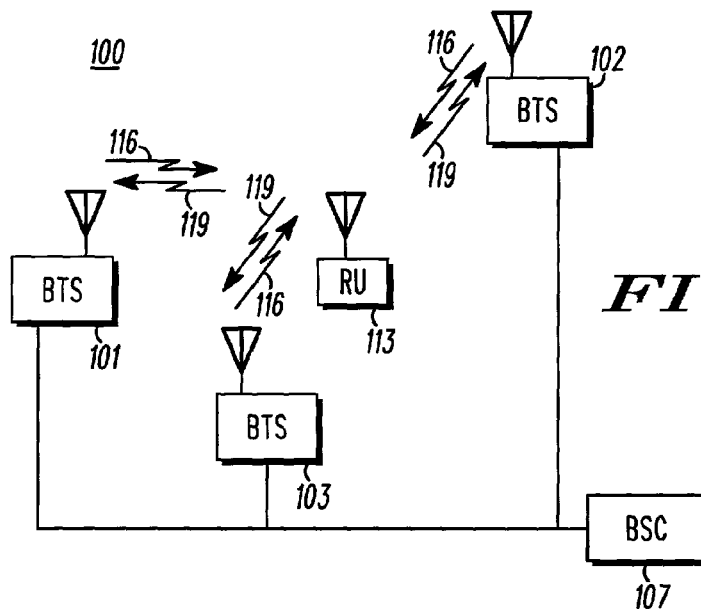
FIG. 1 is a block diagram of a communication system in accordance with the preferred embodiment of the present invention.

Turning now to the drawings, wherein like numerals designate like components, FIG. 1 is a block diagram of communication system 100 in accordance with the preferred embodiment of the present invention. In the preferred embodiment of the present invention, communication system 100 utilizes a Code Division Multiple Access (CDMA) system protocol as described in the Cellular System Remote unit-Base Station Compatibility Standard of the Electronic Industry Association/Telecommunications Industry Association Interim Standard 2000 (TIA/EIA/IS-2000-C) However, in alternate embodiments communication system 100 may utilize other digital cellular communication system protocols such as, but not limited to, the next generation CDMA architecture as described in the UMTS Wideband CDMA SMG2 UMTS Physical Layer Expert Group Tdoc SMG2 UMTS-L1 221/98 (UMTS 221/98), or the next generation Global System for Mobile Communications (GSM) protocol, the CDMA system protocol as described in "Personal Station-Base Station Compatibility Requirements for 1.8 to 2.0 GHz Code Division Multiple Access (CDMA) Personal Communication Systems" (American National Standards Institute (ANSI) J-STD-008), or the Third Generation Partnership Project (3GPP) Third Generation Mobile System Release 3.

Communication system 100 includes a number of network elements such as base stations 101–103, mobile, or remote unit (RU) 113, and Base Station Controller (BSC) 107. As shown, remote unit 113 is communicating with base station 101–102 via uplink communication signals 119 and base stations 101–103 are communicating with remote unit 113 via downlink communication signals 116. In the preferred embodiment of the present invention, all network elements are available from Motorola, Inc. (Motorola Inc. is located at 1301 East Algonquin Road, Schaumburg, Ill. 60196). It is contemplated that network elements within communication system 100 are configured in well known manners with processors, memories, instruction sets, and the like, which function in any suitable manner to perform the function set forth herein.

Past CDMA systems implement soft handoff, where a remote unit communicates with multiple base stations simultaneously during a transition from one cell to another. However, since multiple BTSs transmit to a single remote unit, soft handoff, in many real-world cases of interest, either wastes system capacity or creates additional interference on the forward link. Current CDMA systems, such as those based on TIA/EIA/IS-2000-C, provide a shared high speed packet data channel that is not appropriate for soft handoff. When this type of channel is used, the remote unit selects only one base station to transmit (in this case monocast) the radio frame. In the preferred embodiment of the present invention, a call origination that results in the assignment of the high speed packet data channel is described, however, one of ordinary skill in the art will recognize that the present invention may be incorporated into communication systems not utilizing soft handoff. Additionally, in the following description, no distinction is made between initiating communications between various base stations and initiating communications between various sectors of a single, or multiple base stations. Thus, for the following discussion, the procedures utilized to initiate communication to a particular base station can be equally applied to initiating communication to a particular sector within a base station. For the latter case, each sector of a base station can be treated as a separate base station for communication initiation purposes.

Figure 2:
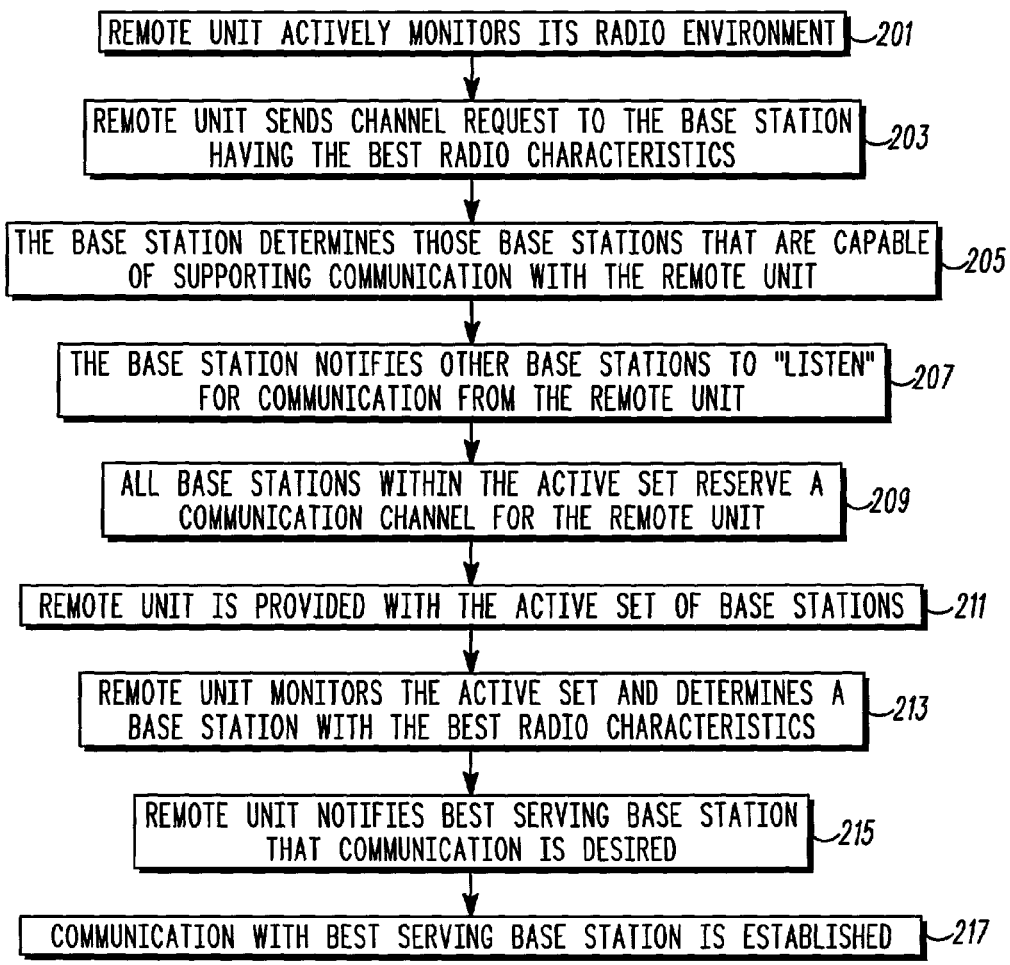
FIG. 2 is a flow chart showing operation of the communication system of FIG. 1 in accordance with the preferred embodiment of the present invention.

FIG. 2 is a flow chart showing operation of communication system 100 of FIG. 1 in accordance with the preferred embodiment of the present invention. The logic flow begins at step 201 where remote unit 113 actively monitors its radio environment for those base stations having the best radio environment characteristics. In particular, remote unit 113 monitors those pilot channels transmitted from each base station to determine the base station having a best pilot channel reception (Ec/Io). At step 203, remote unit 113 transmits a channel request (TIA/EIA/IS-2000-C Origination Message or Page Response Message) to the base station having the best radio characteristic (e.g., base station 101). In the preferred embodiment of the present invention the Radio Environment Report is sent along with an Origination Message or Page Response Message indicating all base stations with signal strength measurements above a particular threshold (TIA/EIA/IS-2000-C T_ADD). (In the preferred embodiment of the present invention the list of base stations that remote unit 113 detects having signal strength above T_ADD is referred to as the OTHER_REPORTED_LIST of base stations).

Continuing, at step 205 base station 101 determines those base stations within the OTHER_REPORTED_LIST that are capable of supporting communication with remote unit 113. Oftentimes devices on each end of a communication link have differing capabilities. For example, a remote unit may be capable of supporting a first set of operating parameters (e.g., encoding/decoding frame formats, data rate, service options such as data services, . . . , etc.) while a base station within the cellular communication system supports a second set of operating parameters. Additionally, even though a base station may be capable of supporting communication with remote unit 113, the particular base station may not have the resources (e.g., channel cards, processing capability of the base station, link power budget, backhaul capability . . . etc.) to support communication with remote unit 113. With this in mind, base station 101 accesses BSC 107 and is provided those capabilities for base stations within the OTHER_REPORTED_LIST. Base station 101 then determines those base stations eligible (Active Set) for communication with remote unit 113 such that the number of base stations within the Active Set is less than or equal to those in the OTHER_REPORTED_LIST.

Continuing, at step 207, base station 101 notifies all base stations within the Active Set to "listen" for communication from remote unit 113. In particular, base station 101 notifies all base stations within the Active Set to listen for a reverse channel quality indicator channel transmission from remote unit 113. All base stations within the Active Set then reserve a traffic/data channel for communication with remote unit 113 (step 209), and at step 211 base station 101 provides remote unit 113 the Active Set via an Extended Channel Assignment Message. At step 213 remote unit 113 monitors the Active Set and determines the base station having the best radio environment characteristics (e.g., base station 102), and at step 215 initiates communication with base station 102. In particular, at step 215 remote unit 113 utilizes the WALSH_COVER field within the reverse channel quality indicator channel to notify the best-serving base station that communication is desired with the base station. In the preferred embodiment of the present invention, the WALSH_ COVER field is mapped to the PILOT_PN field described in an Extended Channel Assignment Message. Finally, at step 217, communication on a traffic/data channel with base station 102 is established while all other base station may release their reserved channels.

As described above, because remote unit 113 (and not base station 101) makes a determination on which base station to initiate communication, radio environment characteristics for each base station within the Active Set can be determined just prior to establishing communication. This greatly reduces the chances that the remote unit will establish communications with a base station having inferior radio environment characteristics.

FIG. 3 is a flow chart showing operation of a base station in FIG. 1 in accordance with a first embodiment of the present invention. In the first embodiment of the present invention, base station operation is described in response to an Origination Message or Page Response Message received by the base station. The logic flow begins at step 301 where a base station (e.g., base station 101) receives a channel request message (Origination Message or Page Response Message) from remote unit 113. In response to the channel request message, base station 101 analyzes the message (step 303) to determine those base stations that remote unit receives with signal strength levels above a threshold (T_ADD). More particularly, base station 101 determines the OTHER_REPORTED_LIST of base stations from the Radio Environment Report received along with the Origination Message or Page Response Message. Once determined, the candidate base stations are analyzed (step 305) to determine if each base station within the OTHER_REPORTED_LIST is capable of supporting communication with remote unit 113. In particular, base station 101 determines the capabilities of each base station within the OTHER_REPORTED_LIST of base stations through a locally kept database within each base station or by reporting the OTHER_REPORTED_LIST to BSC 107 which in turn communicates to the base station 101 the Active Set.

Finally, at step 307 base station 101 instructs all base stations capable of supporting communication with remote unit 113 to "listen" for uplink communication from remote unit 113. As described above, base station 101 notifies all base stations within the Active Set to listen for a reverse channel quality indicator channel transmission from remote unit 113.

FIG. 4 is a flow chart showing operation of a base station in FIG. 1 in accordance a second embodiment of the present invention. In the second embodiment of the present invention operation of a base station is described in response to an instruction to "listen" for a remote unit communication. In the second embodiment, the base station receiving the instruction to "listen" for the remote unit may, or may not, be the same base station that received the Origination Message or Page Response Message from the remote unit.

The logic flow begins at step 401 where a base station (e.g., base station 103) receives a request to "listen" for an uplink communication from remote unit 113 and reserves a traffic/data and/or control channel for communication with remote unit 113. At step 403 base station 103 monitors for uplink communication from remote unit 113. In particular, base station 103 monitors uplink communication signal 119 to determine reception of a channel quality indicator channel transmitted by remote unit 113.

Continuing, at step 405, base station 103 determines if it has been selected by remote unit 103 for communication. In particular, base station 103 monitors the WALSH_COVER field received from remote unit 113 to determine if it indicates that base station 103 has been selected for subsequent communication. As one of ordinary skill in the art would recognize, the determination that communication has, or has not been received from remote unit 113 will be made after a predetermined amount of time has passed. More particularly, once base station 103 has been instructed to "listen" for remote unit 113, base station 103 will listen for communication, and determine whether or not communication with remote unit 113 has been received after a predetermined amount of time has passed (e.g., 5 seconds). If at step 405, it has been determined that the received WALSH_COVER from remote unit 113 corresponds to base station 103, then the logic flow continues to step 407 where subsequent communication begins between base station 103 remote unit 113. If, however, it has been determined that the received WALSH_COVER received from remote unit 113 does not correspond to base station 103, then the logic flow continues to step 409 where the traffic/data or control channel resource may be released from base station 103.

Figure 5:
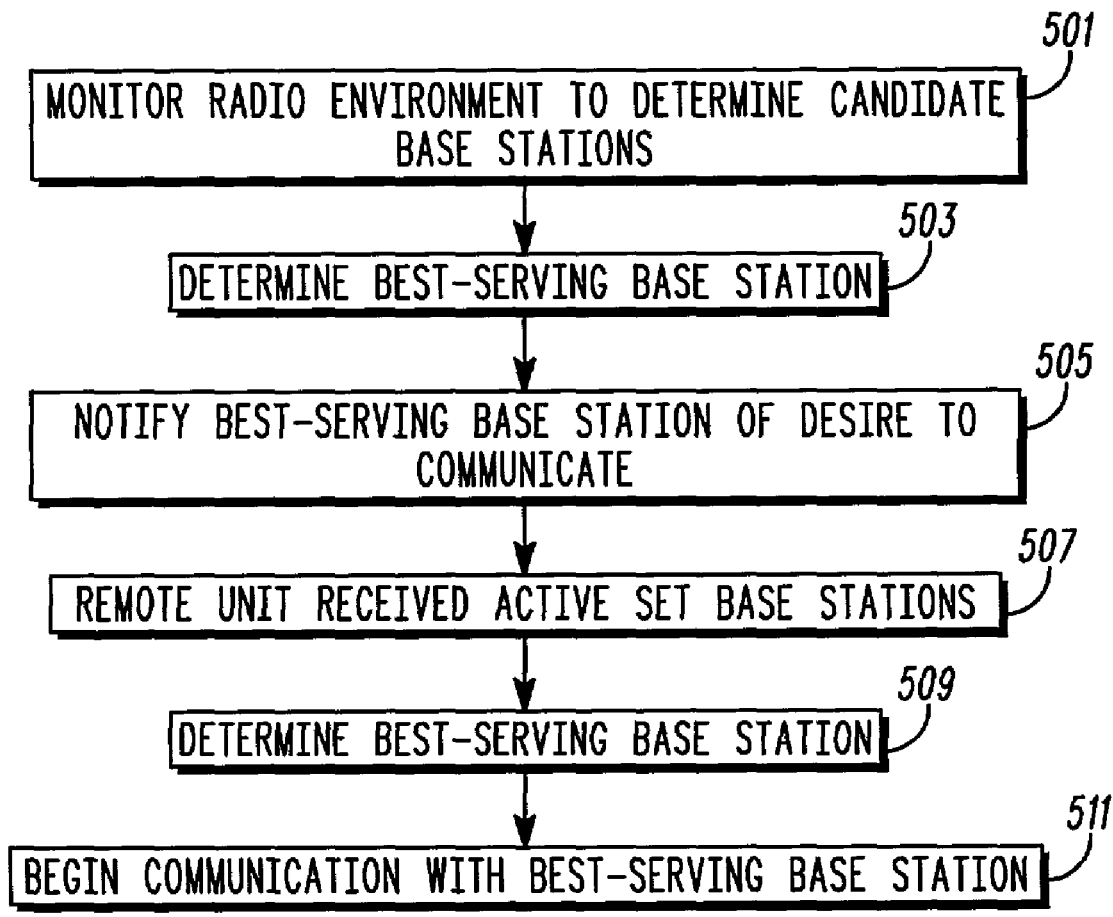
FIG. 5 is a flow chart showing operation of the remote unit of FIG. 1 in accordance with the preferred embodiment of the present invention.

FIG. 5 is a flow chart showing operation of the remote unit of FIG. 1 in accordance with the preferred embodiment of the present invention. The logic flow begins at step 501 where remote unit monitors its radio environment to determine those base stations having signal strength levels above a threshold (T_ADD). At step 503 remote unit 113 determines a best-serving base station. As discussed above, the best-serving base station is the base station having the best radio environment characteristics. Remote unit 113 then notifies the best-serving base station of its desire to communicate (step 505) via a channel request message. As discussed above, this desire to communicate is transmitted to the best-serving base station via an Origination Message or Page Response Message. In response to the channel request message, at step 507 the remote unit receives from the best-serving base station, a list of base stations (Active Set) capable of communicating with remote unit 113. Remote unit 113 then monitors the Active Set of base stations to determine the base station having the best radio environment characteristics (step 509), that is, at step 509 remote unit 113 monitors the Active Set base stations for the base station having the best reception. As described above, because remote unit 113 may lie in a rapidly changing radio environment, the best-serving base station from the Active Set may, or may not be the base station that was transmitted the Origination Message or Page Response Message. Finally, at step 511, remote unit 113 begins communication (originates the call) with the best-serving base station. As discussed above this is accomplished by remote unit 113 utilizing the WALSH_COVER field within the reverse channel quality indicator channel to notify the best-serving base station that communication is desired with the base station.

While the invention has been particularly shown and described with reference to particular embodiments, it will be understood by those skilled in the art that various changes in form and details may be made therein without departing from the spirit and scope of the invention. It is intended that such changes come within the scope of the following claims.

What is claimed is:

1. A method for performing call origination within a communication system, the method comprising the steps of:
   sending, by a remote unit, a channel request message to a base station;
   in response to the channel request message, receiving by the remote unit, a list of base stations adapted to communicate with the remote unit;
   determining, by the remote unit, a best-serving base station from the list of base stations adapted to communicate with the remote unit and
   initiating communication with the best-serving base station by transmitting a reverse channel quality indicator channel to notify the best-serving base station that communication is desired with the best-serving base station.

2. The method of claim 1 wherein the step of sending, by the remote unit, the channel request message comprises the steps of:
   analyzing the remote unit's radio environment to determine a first best serving base station; and
   sending the channel request message to the first best serving base station in response to the step of analyzing.

3. The method of claim 1 wherein the step of initiating communication with the best-serving base station comprises the step of utilizing a WALSH_COVER field within the reverse channel quality indicator channel to notify the best-serving base station that communication is desired with the best-serving base station.

4. A method for initiating communication within a communication system, the method comprising the steps of:
   receiving an instruction to listen for uplink communication from a remote unit;

in response to the instruction to listen, reserving an uplink communication channel for communicating with the remote unit; and receiving a base station selection indication (WALSH_COVER) from the remote unit, wherein the WALSH_COVER comprises a reserved field within an uplink channel quality indicator channel transmitted from the remote unit.

* * * * *